(12) United States Patent
Taverniers et al.

(10) Patent No.: US 12,717,987 B2
(45) Date of Patent: Aug. 25, 2026

(54) MODELING OF LIQUID-GAS MENISCUS DYNAMICS FOR ARBITRARY NOZZLE GEOMETRIES

(71) Applicant: Genesee Valley Innovations, LLC, Santa Clara, CA (US)

(72) Inventors: Søren Taverniers, Palo Alto, CA (US); Adrian Lew, Stanford, CA (US); Svyatoslav Korneev, San Jose, CA (US); Christoforos Somarakis, Gilroy, CA (US); Morad Behandish, San Mateo, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 917 days.

(21) Appl. No.: 18/086,348

(22) Filed: Dec. 21, 2022

(65) Prior Publication Data

US 2024/0211655 A1 Jun. 27, 2024

(51) Int. Cl.
*G06F 30/23* (2020.01)
*G06F 113/10* (2020.01)

(52) U.S. Cl.
CPC .......... *G06F 30/23* (2020.01); *G06F 2113/10* (2020.01)

(58) Field of Classification Search
CPC ...... G06F 30/23; G06F 30/20; G06F 2113/10; G06F 2111/10
USPC .......................................................... 703/9
See application file for complete search history.

(56) References Cited

U.S. PATENT DOCUMENTS

2022/0410273 A1* 12/2022 Price .................... G06V 10/25

* cited by examiner

*Primary Examiner* — Fawaad Haider
(74) *Attorney, Agent, or Firm* — Mueting Raasch Group

(57) ABSTRACT

Techniques for determining a damping rate of unforced oscillations of a meniscus are disclosed. An example method includes receiving input describing a shape of a container, physical parameters of a liquid inside the container, and an equilibrium shape of the meniscus. The method also includes generating a mesh conforming to the shape of the container and generating a discrete version of a continuous eigenvalue problem based on this mesh. The method also includes computing, at appropriate mesh nodes, values for pressure, velocity components, and meniscus surface deformation corresponding to a suitable number of least-damped late-time oscillation modes of the liquid and computing an angular frequency and damping rate of these least-damped late-time oscillation modes from the discrete version of the continuous eigenvalue problem. The method also includes identifying the mode that has the lowest damping rate and computing a liquid relaxation time by inverting the damping rate of the identified mode.

34 Claims, 9 Drawing Sheets

MODELING OF LIQUID-GAS MENISCUS DYNAMICS FOR ARBITRARY NOZZLE GEOMETRIES

TECHNICAL FIELD

Implementations of the present disclosure relate to techniques for computing parameters describing the dynamics of the liquid inside a container connected to a gas reservoir, such as a print nozzle used in additive manufacturing.

BACKGROUND

Additive manufacturing (also known as 3D printing) enables production of structures that optimize strength-to-weight ratios. For example, hollow structures that are expensive or difficult to achieve in machining processes (i.e., removal of materials by cutting) may be created layer by layer in additive manufacturing. Many forms of additive manufacturing make use of transforming matter from one state to another through, e.g., chemical reactions or heat addition. For instance, they may melt a solid material into its liquid form in a heating chamber, with the resulting liquid being collected in a reservoir from which droplets can be ejected (also referred to as "jetted") through a nozzle. The nozzle may be shaped to control the size and shape of the droplets. The build platform can be controlled so that the droplets land on the substrate in a controlled manner to build the 3D object by coalescing with previously deposited droplets and solidifying.

Depending on the type of 3D printing technology, the quality of the output may be highly dependent on a variety of factors, including the consistency and quality of the droplet jetting process. If the droplet deposition becomes erratic, the 3D printed part may deviate significantly from its intended form.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. Like numerals indicate like elements.

DETAILED DESCRIPTION

Figure 1A:
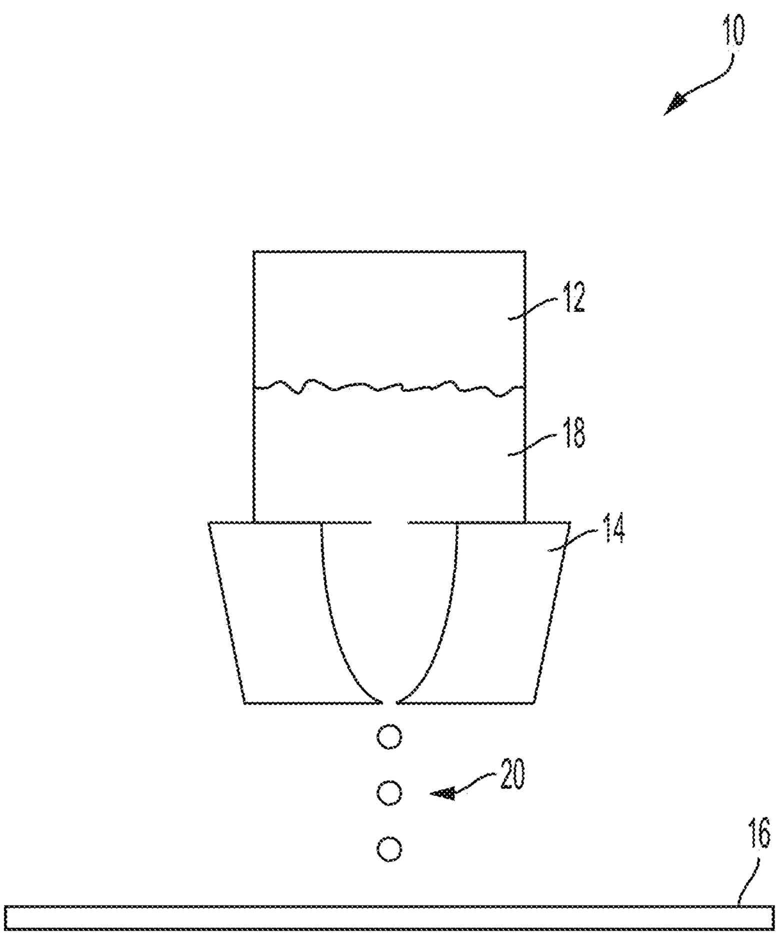
FIG. 1A depicts a liquid ejection system 10, in accordance with certain aspects of the present disclosure.

Aspects of the present disclosure provide various techniques for improving the performance of a print nozzle used in additive manufacturing. The techniques disclosed herein are applicable to 3D printing processes in which droplets of liquid print material are ejected from a nozzle and deposited onto a substrate. Examples include drop-on-demand printing of multimaterial composites using slurry inks, and jetting of liquid polymers, binders, and metals, among others. In the case of liquid metal jetting, a single droplet deposited on a solid of the same material serves as the basic building block for fabrication by precise, droplet-wise deposition. One particular type of liquid metal jetting printer is a magnetohydrodynamic (MHD) printer, which is suitable for depositing liquid metal layer upon layer to form a 3D metallic object. In an MHD printer, an electrical current flows through a metal coil, which produces time-varying magnetic fields that induce eddy currents within a reservoir filled with a liquid metal alloy. Coupling between magnetic and electric fields within the liquid metal results in a Lorentz force.

To ensure the production of high-quality 3D printed parts, the stream of droplets should be consistent and predictable. The quality of the 3D printed parts may be compromised if the stream of droplets becomes irregular, for example, if the droplets deviate from a straight jetting path, break into smaller fragments, have inconsistent shapes, or are ejected from the nozzle at an inconsistent frequency or before the liquid in the nozzle is quiescent. One aspect that affects droplet consistency is the dynamics of the liquid contained in the printhead nozzle, specifically, the dynamics of the liquid-gas boundary (i.e., meniscus) at the outlet of the nozzle. After a droplet is ejected from the nozzle, the meniscus will oscillate for a period of time known as the relaxation time, until it settles into a quiescent state. If subsequent droplets are ejected from the nozzle within the relaxation time of the meniscus oscillation associated with the previous droplet ejection, the jetting consistency and hence the quality of the 3D printed parts may be impacted. This may prevent stable jetting at higher printing frequencies.

The relaxation time of the meniscus oscillations depends on the nozzle geometry and properties of the ejected material, such as its density and dynamic viscosity, and the surface tension between the material and the gas outside the nozzle. Proper design of the nozzle geometry can increase the damping rate of the liquid's oscillations, resulting in improved consistency of the jetting and therefore a higher quality of the 3D printed part. The damping rate for a particular nozzle profile can be calculated using high-fidelity Computational Fluid Dynamics (CFD). However, traditional CFD techniques involve numerical integration of the governing partial differential equations (i.e., Navier-Stokes equations or approximation thereof) over a long time horizon to obtain the late-time dynamics. This makes such techniques too computationally expensive and time consuming for this purpose.

The present techniques provide a model that can predict the angular oscillation frequency and damping rate of the meniscus for arbitrary nozzle geometries with reasonable accuracy within a computation time that is orders of magnitude shorter than what is possible with CFD simulations.

In accordance with the present techniques, the damping rate calculation is transformed into the solution of a mathematical (continuous) eigenvalue problem, avoiding the computationally expensive numerical time integration required in CFD methods. A Finite Element Method (FEM) is used to obtain a discrete quadratic eigenvalue problem for an unstructured finite element mesh generated for the nozzle geometry. The discrete quadratic eigenvalue problem is then converted into an equivalent linear generalized eigenvalue problem, which is solved to obtain the damping rate. This technique enables rapid prototyping of 3D printhead nozzles for drop-on-demand liquid jetting.

Nozzle prototyping can be done by iteratively refining an initial design. In each iteration, the damping rate of the meniscus is calculated for the updated design using the techniques disclosed herein, while satisfying a set of external constraints. In this way, the final nozzle design can be improved to achieve a nozzle geometry that maximizes the damping rate while satisfying a set of external constraints, such as droplet specifications-based constraints that affect the nozzle shape so as to guarantee that the jetted droplets have on average a user-defined mass, velocity, etc.

Additionally, the present techniques can be used as a diagnostic tool for detecting issues with the nozzle such as clogging. Such a diagnostic tool may be created by establishing a relationship between the simulated meniscus dynamics for a given nozzle design and choice of material (both the liquid inside the nozzle and the gas in the connected reservoir) and a number of nozzle issues, as the latter will change the meniscus dynamics in some way, e.g., clogging may decrease the radius of the functional (non-clogged) part of the nozzle outlet and thereby increase the damping rate of the least-damped oscillation mode. In order to generate a lookup table correlating meniscus dynamics with various nozzle issues, a fast surrogate model such as the one described by the present techniques is needed due to the large number of simulations that creating such a table requires. Once the table is available, during printing it can be used to correlate, in real-time, parameters of the meniscus dynamics (i.e., damping rate and/or angular frequency) measured via high-speed camera with the corresponding nozzle issue, and take action to correct or stop the printing process.

While the techniques described herein may be used for computing parameters describing the dynamics of the liquid in a 3D printhead nozzle, they may be used to simulate those dynamics for various other types of liquid-filled containers connected to a gas reservoir, including 2D printheads and other systems.

FIG. 1A depicts a liquid ejection system 10, in accordance with certain aspects of the present disclosure. The liquid ejection system 10 may be incorporated in a wide variety of components, including 2D printers, 3D printers, and droplet-based microfluidic devices, for example. The liquid ejection system 10 includes a reservoir 12, a nozzle 14, and a substrate 16. The reservoir 12 may contain a liquid 18 to be ejected onto the substrate 16. The liquid 18 may be any type of liquid suitable for the particular application, such as molten metal, liquid polymers, ink, chemical reagents, and others. Depending again on the particular application, the substrate 16 may be a build platform (e.g., 3D printing), paper (e.g., 2D printing), a circuit chip (e.g., microfluidics), and others.

The reservoir 12 provides the liquid 18 to the nozzle 14, and an ejection mechanism (not shown) may be configured to cause droplets 20 of the liquid 18 to be ejected from the nozzle 14 onto the substrate 16. Various characteristics of the droplets 20 will be affected by the shape of the nozzle 14, such as the size and shape of the droplets. Moreover, the shape of the nozzle 14 also affects the speed at which droplets can be ejected while maintaining the desired droplet characteristics. The disclosed techniques enable efficient modeling of the nozzle shape to achieve improved nozzle performance such as higher droplet ejection rates.

It will be appreciated that the liquid ejection system 10 is a simplified schematic of a general liquid ejection system that may have various applications. An actual implementation will include various additional components not shown in FIG. 1A. One such implementation may be a 3D printer such as a liquid metal jetting printer, a more detailed example of which is described in relation to FIG. 1B.

Figure 1B:
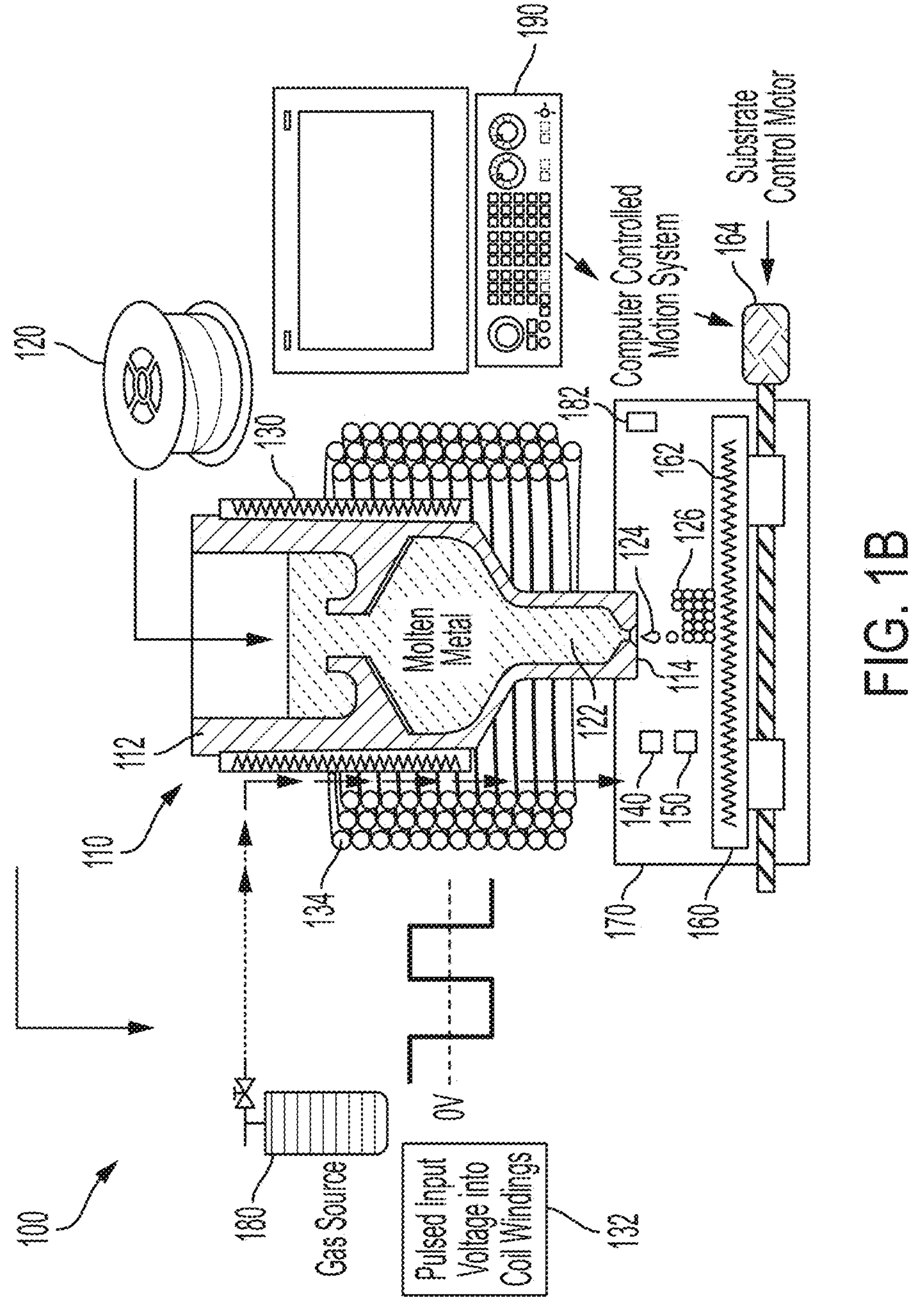
FIG. 1B depicts a schematic cross-sectional view of a 3D printer, in accordance with certain aspects of the present disclosure.

FIG. 1B depicts a schematic cross-sectional view of a 3D printer 100, in accordance with certain aspects of the present disclosure. The 3D printer 100 may include an ejector (also referred to as a pump chamber) 110. The ejector 110 may define an inner volume that is configured to receive a printing material 120. The printing material 120 may be or include a polymer (e.g., a photopolymer), a metal, or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., a polymer or a metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment involving the jetting of a liquid metal, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorentz force. The Lorentz force creates a pressure at an inlet of a nozzle 114 of the ejector 110. The pressure causes the liquid metal 122 to be jetted through the nozzle 114 in the form of one or more droplets 124. The shape of the nozzle 114 may be designed to increase the damping rate of oscillations of the meniscus, which allows the frequency of the droplet ejection to be increased while maintaining consistency of the droplets. An example technique for determining an improved shape for the nozzle 114 is described below in relation to FIGS. 2 and 3.

The 3D printer 100 may also include one or more cameras (one is shown: 140) that is/are configured to capture video and/or images of the nozzle meniscus and/or the ejected droplets 124. In one embodiment, the video may include signals derived from a sequence of images. In another embodiment, the images may be or include frames of the video. The camera 140 may be or include a high-speed camera that is configured to capture the images and/or video at a rate of from about 2,000 frames per second to about 50,000 frames per second or about 10,000 frames per second to about 30,000 frames per second (e.g., 19,000 frames per second). In one example, the jetting may occur at a frequency from about 100 Hz to about 1000 Hz, and the camera 140 may operate at a frequency from about 10,000 frames per second to about 50,000 frames per second. In one embodiment, monitoring during the jetting of the droplets may be triggered by the 3D printer 100 as a normal checkup, operator intervention, detection of irregular jetting, and/or by detection of greater than usual deviations of the 3D printer 100.

The 3D printer 100 may also include one or more light sources (one is shown: 150) that is/are configured to shine light on the nozzle 114, the droplets 124, or both. The light source 150 may be or include a fiber optic light source, an LED light source, and others. The light source 150 may be or include a collimated light source. The light source 150 may be or include a white light source.

The 3D printer 100 may also include a substrate (also referred to as a build plate or build platform) 160 that is positioned below the nozzle 114. The droplets 124 that are jetted through the nozzle 114 may land on the substrate 160 and cool and solidify to produce a 3D object 126. The substrate 160 may include a heater 162 therein that is configured to increase the temperate of the substrate 160. The 3D printer 100 may also include a substrate control motor 164 that is configured to move the substrate 160 as the droplets 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

In one embodiment, the 3D printer 100 may also include an enclosure 170. The enclosure 170 may be positioned at least partially around the ejector 110, the nozzle 114, the droplets 124, the 3D object 126, the heating elements 130, the coils 134, the substrate 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the droplets 124, the 3D object 126, and/or the substrate 160.

The 3D printer 100 may also include a gas sensor 182. The gas sensor 182 may be positioned within the enclosure 170. The gas sensor 182 may also or instead be positioned proximate to the droplets 124, the 3D object 126, and/or the substrate 160 (e.g., in an embodiment where the enclosure 170 is omitted). The gas sensor 182 may be configured to measure a concentration of the gas, oxygen, or a combination thereof.

The 3D printer 100 may also include a computing system 190. The computing system 190 may be configured to control the introduction of the printing material 120 into the ejector 110, the heating elements 130, the power source 132, the substrate control motor 164, the gas source 180, the gas sensor 182, or a combination thereof. For example, the computing system 190 may also be configured to adjust one or more parameters of the 3D printer based at least partially upon the behavior of the droplets. Additionally, the computing system 190 may be configured to interrupt a print job, alert an operator of unfavorable printing conditions, and or suggest corrective measures.

Figure 2A:
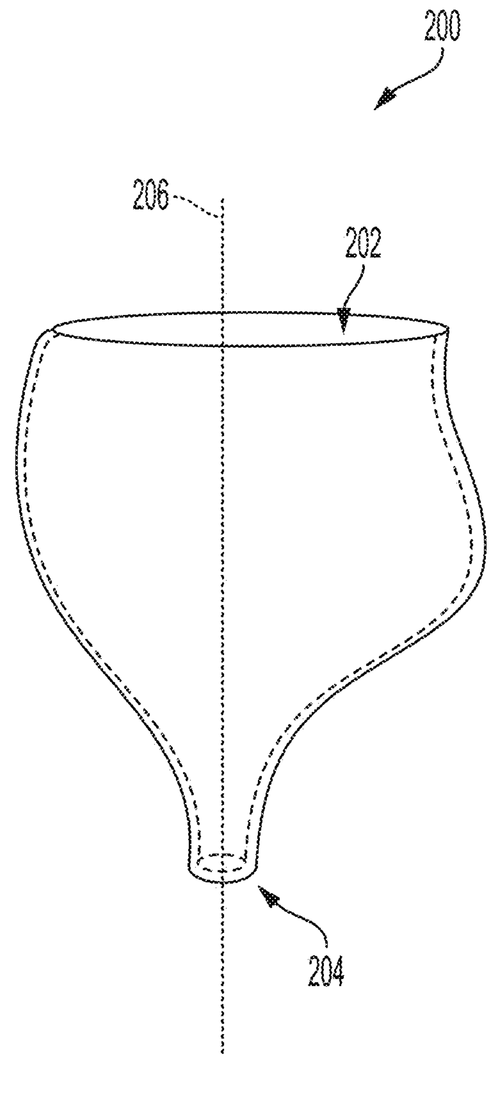
FIG. 2A depicts an example nozzle with general non-axisymmetric shape, in accordance with certain aspects of the present disclosure.
Figure 2B:
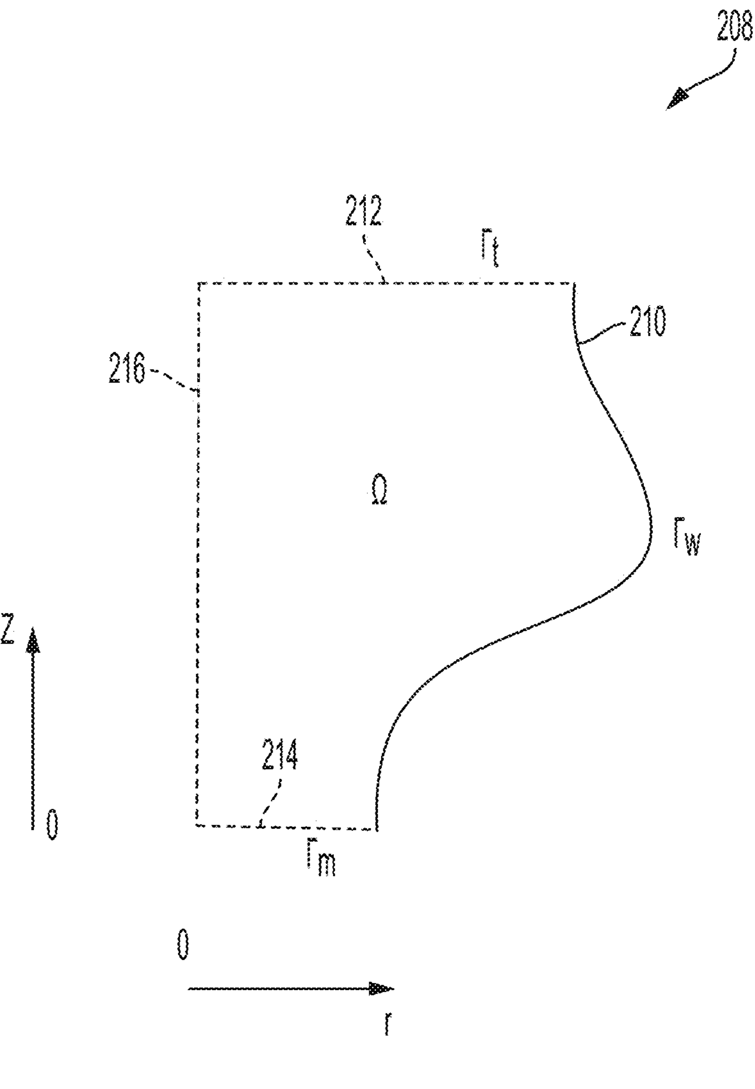
FIG. 2B depicts an example nozzle with axisymmetric shape, in accordance with certain aspects of the present disclosure.

FIG. 2A depicts an example nozzle 200 with general non-axisymmetric shape, in accordance with certain aspects of the present disclosure. The nozzle 200 may be included in any type of printer, including 2D and 3D printers. The top 202 of the nozzle 200 may be coupled to a reservoir for receiving a printing medium, such as molten metal, polymer, or ink, for example. The nozzle 200 also includes an outlet 204 where the printing medium is ejected onto a substrate. The shape of the nozzle 200 may be designed using the techniques described herein to ensure that the meniscus at the nozzle outlet 204 has a high damping rate. The nozzle 200 may be any suitable 3-dimensional shape, which may or may not be axisymmetric. For example, FIG. 2A shows a nozzle whose shape is not axisymmetric about the central axis 206. In some embodiments, of the present techniques, the design algorithm may be simplified by assuming an axisymmetric nozzle shape as shown in FIG. 2B. However, it will be appreciated that the present techniques can be used with any shape nozzle.

FIG. 2B depicts an example nozzle 208 with axisymmetric shape, in accordance with certain aspects of the present disclosure. The nozzle shape 208 is one example of a nozzle shape that may be provided as input to a simulation for computing a damping rate. However, it will be appreciated that the techniques used herein can be used to determine a damping rate for any arbitrary nozzle shape, including axisymmetric and non-axisymmetric geometries. The nozzle shape 208 is characterized by a side wall 210, a top boundary 212, and a meniscus 214. The nozzle shape 208 is axisymmetric about the axis 216, which defines the center line of the nozzle. These boundaries define the domain 22, which is filled with a liquid used as a 3D printing medium. In some embodiments, the liquid may be treated as being incompressible.

The meniscus shown in FIG. 2B is the boundary between the liquid in the domain Q, and a gas, which may be air, nitrogen, oxygen, or any other suitable gas. The meniscus 214 shown in FIG. 2 is an equilibrium profile, which is flat and therefore neglects the influence of gravity. This helps to simplify the equations that are used to solve for the damping rate. However, it will be appreciated that the techniques may also be extended to include a curved equilibrium profile. In FIG. 2B, the nozzle shape is described with reference to a height, Z, and a corresponding radius, r. Accordingly, the nozzle shape 208 may be described by a number of height and radius pairs that define the contour of the side wall 210. However, it will be appreciated that the nozzle shape 208 may be described in any suitable manner.

In embodiments of the present techniques, a semi-analytical approach is used to calculate the damping rate of the liquid in the container and, hence, of its liquid-gas interface oscillations. This semi-analytical approach focuses on the damping of late-time dynamics, which involves small-amplitude oscillations in a linear regime following a period of nonlinear liquid motion. Accordingly, rather than solving the full (nonlinear) N-S equations using CFD over the entire time horizon (nonlinear and linear) of the liquid motion, the present techniques involve linearizing the N-S equations and considering small oscillations around an equilibrium liquid-gas profile. Assuming an identical harmonic time dependence for meniscus surface deformation, ¿, velocity, u, and pressure, p, yields the following equations:

$$\xi(x, y, z, t) = \exp(\lambda t)\hat{\xi}(x, y, z \quad \text{Eq. (1)}$$

$$u(x, y, z, t) = \exp(\lambda t)\hat{u}(x, y, z) \quad \text{Eq. (2)}$$

$$p(x, y, z, t) = \exp(\lambda t)\hat{p}(x, y, z) \quad \text{Eq. (3)}$$

In the above equations, $\lambda=-\gamma+i\omega\in\mathbb{C}$ is a complex number, and $\hat{u}: \Omega\to\mathbb{R}^3$ and $\hat{p}: \Omega\to\mathbb{R}$ are the space-dependent parts of the solution, with x, y, z the spatial coordinates within the container's domain. This converts the problem into a purely space-dependent problem, avoiding the expensive numerical time integration required when using CFD solvers. With this formulation, the negative real part of λ is the damping rate, γ, of the liquid oscillation and the absolute value of the imaginary part, |ω|, is its angular frequency. In other words, for appropriate values of 1, the space-dependent functions $\hat{\xi}(x, y, z)$, $\hat{u}(x, y, z)$ and $\hat{p}(x, y, z)$ will characterize the spatial pattern of the oscillation modes of the liquid-gas interface, with |ω| and γ their angular frequency and damping rate, respectively.

To find these modes, the space-dependent equations can be nondimensionalized such that they are only a function of a single dimensionless number, the Reynolds number $Re=\sqrt{\rho R\sigma/\mu^2}$ with ρ the liquid's density, μ its dynamic viscosity, σ the surface tension, and R the radius of the liquid-gas interface. A weak (integral) formulation of the space-dependent equations defines a continuous symmetric generalized eigenvalue problem (GEP) characterized by the following equations:

$$0 = \lambda a(\hat{u}, v) + c(\hat{u}, v) + b(v, \hat{p}) + s(\hat{\xi}, v_z) \quad \text{Eq. (4a)}$$

$$0 = b(\hat{u}, q) \quad \text{Eq. (4b)}$$

$$0 = \lambda s(\hat{\xi}, \zeta) - s(\hat{u}_z, \zeta) \quad \text{Eq. (4c)}$$

or, more succinctly, $$0 = g((\hat{u}, \hat{p}, \hat{\xi}), (v, q, \zeta)) + \lambda h((\hat{u}, \hat{p}, \hat{\xi}), (v, q, \zeta)) \quad \text{Eq. (5)}$$

where $g((\hat{u}, \hat{p}, \hat{\xi}), (v, q, \zeta))=c(\hat{u}, v)+b(v, \hat{p})+s(\hat{\xi}, v_z)+b(\hat{u}, q)-s(\hat{u}_z, \zeta)$ and $h((\hat{u}, \hat{p}, \hat{\xi}), (v, q, \zeta))=a(\hat{u}, v)+(\hat{\xi}, \zeta)$. Here, $(\hat{u}, \hat{p}, \hat{\xi})$ is the eigenvector corresponding to the eigenvalue λ, and Eq. (4b) represents the incompressibility condition. Using this weak form of the problem, a finite-element based numerical method can be used to discretize the domain Ω and obtain numerical approximations of û, p̂ and $\hat{\xi}$ at the nodes of the resulting mesh, as well as the angular frequency and damping rate for the corresponding modes.

A finite-element discretization using Taylor-Hood triangles converts the continuous GEP of equation (5) into a symmetric matrix (discrete) GEP.

$$Gf = \lambda Hf \quad \text{Eq. (6)}$$

In equation (6), the matrices G and H are assembled from the bilinear forms $g((\hat{u}, \hat{p}, \hat{\xi}), (v, q, \zeta))$ and $h((\hat{u}, \hat{p}, \zeta), (v, q, \zeta))$, respectively, defined above. G and H are symmetric matrices of size n×n, and $f\in\mathbb{C}^n$ contains the n nodal (i.e., evaluated at the nodes of the finite elements) degrees of freedom for the velocity and the pressure inside the domain of interest, and for the meniscus surface deformation on the bottom boundary of the domain (the meniscus surface deformation degrees of freedom essentially duplicate the nodal degrees of freedom for the normal velocity components on the meniscus). Additionally, $f=f_r+if_i$. In other words, f is a combination of $f_r$ and $f_i$ that can be used to express the pressure (p̂), velocity (û) and meniscus surface deformation ($\hat{\xi}$) values at the nodal locations. The associated values of λ yield the angular frequency and damping rate of the corresponding oscillation modes. Use of the above solution method to obtain the meniscus dynamics is described further in relation to FIG. 3.

Figure 3:
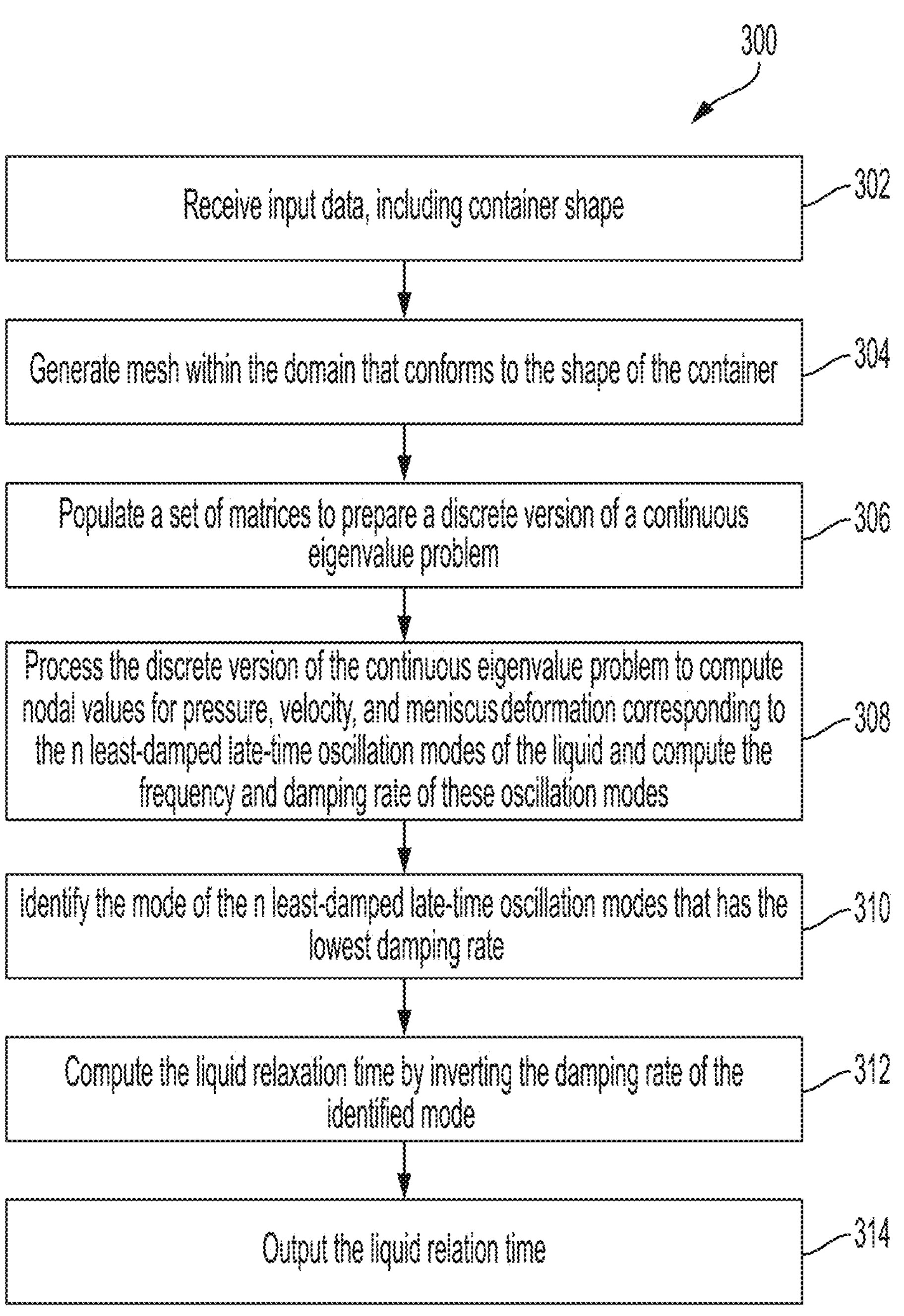
FIG. 3 is a process flow diagram for a method of determining the meniscus damping rate for an arbitrary container shape, in accordance with certain aspects of the present disclosure.

FIG. 3 is a process flow diagram for a method of determining the meniscus damping rate for an arbitrary container shape, in accordance with certain aspects of the present disclosure. The method may be performed by a computing device such as the computing device 700 shown in FIG. 7. This method may be performed using parallel computation on multiple CPU cores to compute the required eigenvalues and their corresponding eigenvectors in a matter of minutes for reasonable mesh resolutions. The method may begin at block 302.

At block 302, input data is received, which may include container shape information, physical parameters of the liquid inside the container, and the surface tension at the liquid-gas interface. The container shape information may be formatted as described in relation to FIG. 2 defines boundaries of the domain Ω. The physical parameters of the liquid inside the domain Ω may include the liquid's density and dynamic viscosity. The input data may also include a target relaxation time of the liquid inside the container. The input data may also include an equilibrium shape of the liquid-gas interface at the output of the container. The liquid-gas interface may be flat as shown in FIG. 2 or may be curved to account for the force of gravity. The container may be a nozzle. However, the present techniques can be applied to other types of containers.

At block 304, a mesh is generated within the domain that conforms to the shape of the container. The mesh includes a plurality of nodes, wherein each node represents a point in the liquid. The mesh may be a two-dimensional triangular mesh, quadrilateral mesh, or of another configuration.

In some embodiments, the mesh is generated using a Finite Element Method (FEM) to discretize volume, Ω, with triangular Taylor-Hood finite elements. These involve continuous piecewise quadratic functions to approximate each velocity component, and continuous piecewise linear functions to approximate the pressure. The triangular Taylor-Hood finite elements provide a good approximation of both velocity and pressure, since these elements satisfy the inf-sup condition for the Stokes equation. This yields a triangular tessellation of the domain (i.e., an unstructured mesh), which may be built using meshing software such as Gmsh or, for simpler container geometries, directly in the computational platform FEniCS (software tool).

At block 306, a discrete version of a continuous generalized eigenvalue problem is prepared by populating a set of matrices, based on the mesh generated at block 304. Specifically, with reference to equation (6), the matrices G and H are assembled from the bilinear forms g((û, p̂, $\hat{\xi}$), (v, q, ζ)) and h((û, p̂, $\hat{\xi}$), (v, q, ζ)), respectively, defined through equations (4a) through (4c), and equation (5). In some embodiments, populating the matrices is accomplished using the computational platform FEniCS. Since these matrices are sparse (i.e., contain many components that are zero), this can be done efficiently using the widely used sparse matrix library PETSc, which stores G and H as PETScMatrix objects following the Compressed Sparse Row (CSR) format.

At block 308, the discrete version of the continuous eigenvalue problem is processed to compute values for pressure, velocity, and meniscus surface deformation at each node for the r least-damped late-time oscillation modes of the liquid, as well as the angular frequency and damping rate of each of the r modes, where r may be any number greater than zero. In some embodiments, the discrete version of the continuous eigenvalue problem may be the generalized matrix eigenvalue problem generated at block 306.

To solve the discrete generalized eigenvalue problem, the non-zero complex values of λ are generated for which the eigenvalue problem has a nontrivial (i.e., non-zero) solution vector f. These combinations (λ, f) form the eigenpairs that describe the liquid's velocity (û) and pressure (p̂) profiles corresponding to the modes of oscillation of the liquid-gas interface (f), as well as the angular frequency and damping rate of these oscillations (ω and γ from λ=−γ+iω, respectively).

The generalized eigenvalue problem may be solved using the Krylov-Schur method, which is an iterative projection-based algorithm that uses a Krylov subspace. In embodiments in which the matrices G and H are stored as PETScMatrix objects, the generalized eigenvalue problem may be solved numerically using the PETSc-compatible eigensolver library SLEPc, which implements the Krylov-Schur method. The result is a small subset of all possible eigenvalues of the system. The cardinality of the subset may be determined based on the target relaxation time of the liquid in the container.

To improve convergence to the correct solution of the discrete eigenvalue problem, in some embodiments, the conditioning of the matrix G may be improved by left-multiplying both sides of the generalized eigenvalue problem (equation 6) with a preconditioner, ∧, where ∧ii=1/maxj|Gij|, where i, j=1, . . . , n, where n is the system size of the generalized eigenvalue problem (equation (6)). This operation does not change the eigenvectors or eigenvalues of equation (6), and may be implemented by modifying the PETScMatrix objects for G and H in the numerical code, resulting in PETSCMatrix objects for G*=∧G and H*=∧H.

Because H is singular, before using Krylov-Schur, a shift-and-invert transform may be applied to the generalized eigenvalue problem to generate the modified problem shown in equation 7 below.

$$(G^* - \zeta H^*)^{-1} H^* g = \theta g \quad \text{Eq. (7)}$$

In the above equation, ζ is the "shift", from which the original eigenvalues A through λ=ζ+(1/θ) can be recovered, where the θ are the eigenvalues of the transformed problem. The shift may be chosen based on the subset of eigenvalues to be targeted as described further below. The eigenvectors remain unchanged. In some embodiments, this shift-and-invert operation can be done by the SLEPc eigensolver.

In some embodiments, the parallel sparse solver MUMPS of SLEPc may be used to obtain the LU factorization of G*−ζH* for computing its inverse. In some embodiments, a random vector g* can be used as the initial vector for building the Krylov subspace. Equation (7) can then be solved via the Krylov-Schur method which may be implemented, for example, in SLEPc. Additionally, a target damping rate (which is the inverse of the target relaxation time received at block 302) may be set to converge more quickly to the eigenvalues with the smallest (in absolute value) real parts (i.e., smallest damping rates). In the case of a shift-and-inverse transform, this target value will be equal to the shift. The target value may be real or complex, with some instances of SLEPc not allowing for complex target values. Hence, the target may be set to the negative of the targeted damping rate. The number of eigenvalues that will be generated (i.e., aimed to be converged) in SLEPc can be specified by the user. Finally, note that by nondimensionalizing the N-S equations, the SLEPc solver may be more robust to changes in the chosen shift/target value. In other words, small changes in the shift do not change the converged values of λ.

At block 310, the least-damped mode (i.e., the mode with the lowest damping rate) is identified. The liquid relaxation time can then be computed by inverting the damping rate for least-damped mode.

At block 312, the liquid relaxation time is provided as output. Outputting the liquid relaxation time may involve displaying the liquid relaxation time and/or storing the liquid relaxation time to memory. For example, the liquid relaxation time may be displayed to a user through a user interface. Additionally, the least-damped may be stored to volatile (e.g., RAM) or non-volatile memory (e.g., storage device) in association with the container parameters that were provided as input at block 302.

Figure 4:
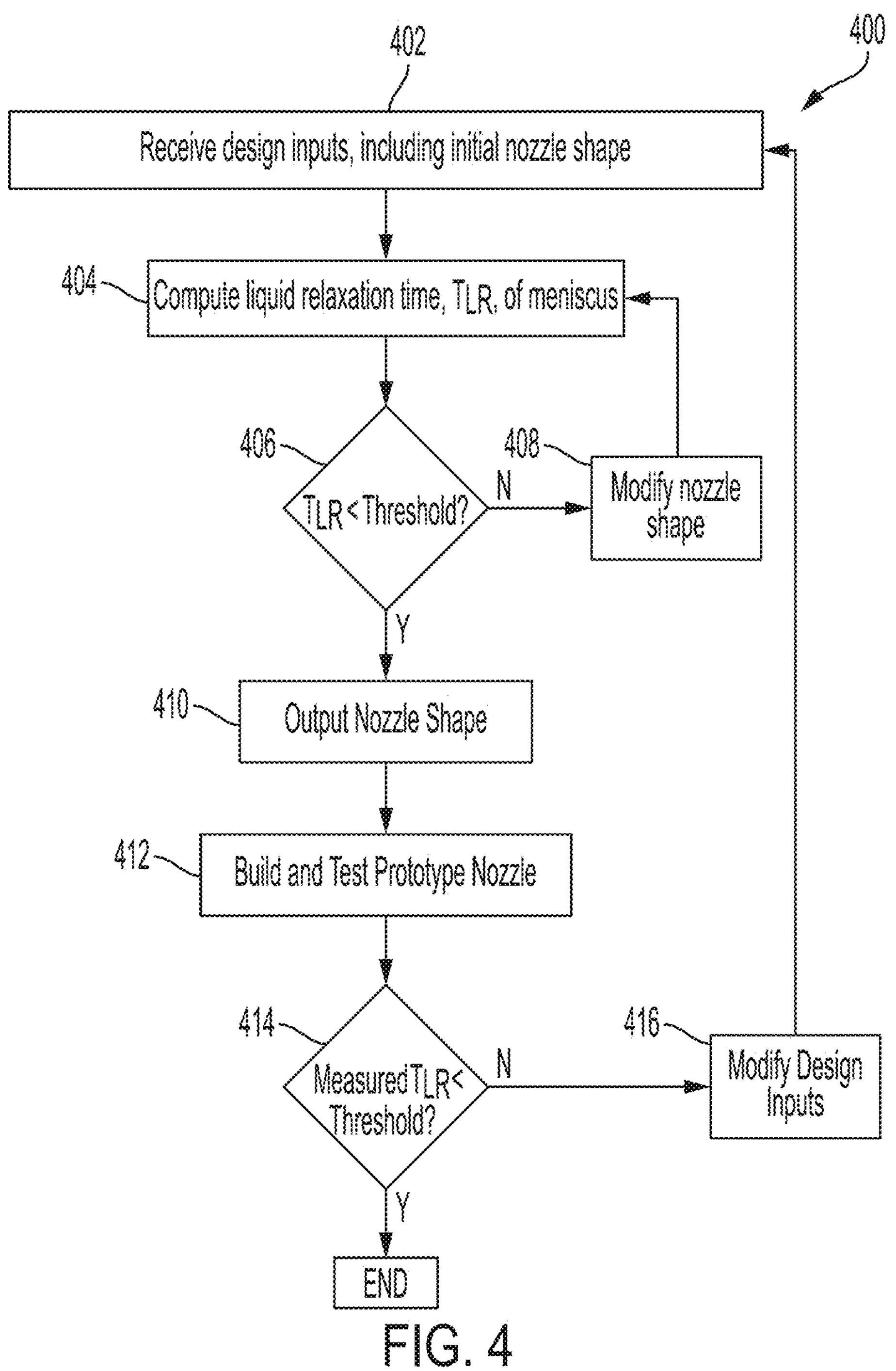
FIG. 4 is a process flow diagram of an example method of generating a nozzle geometry in accordance with certain aspects of the present disclosure.

In some embodiments, additional operations may be performed automatically based on the output value of the liquid relaxation time, such as modifying the container dimensions and reiterating the process to generate a new liquid relaxation time for an updated container geometry, as described in relation to FIG. 4.

Various operations are described as multiple discrete operations, in turn, in a manner that is most helpful in understanding the present disclosure, however, the order of description may not be construed to imply that these operations are necessarily order dependent. In particular, the operations shown in FIG. 3 need not be performed in the order of presentation.

FIG. 4 is a process flow diagram of an example method of generating a nozzle geometry in accordance with certain aspects of the present disclosure. The method may be performed by a computing device such as the computing device 700 shown in FIG. 7. The method 400 is an iterative method that may be used to automatically generate a nozzle design that exhibits a high liquid relaxation time. The method may begin at block 402.

At block 402, design inputs are received. The design inputs may be received from a user and may include an initial nozzle shape, external constraints, and others. The initial nozzle shape is the starting geometry to be used to start the design process and may be characterized by one or more boundaries. The external constraints describe the outer envelope of valid geometries that may be generated. Various additional design inputs may also be received from the user. For example, the user may specify boundary conditions for each of the nozzle boundaries described by the nozzle geometry. For example, some boundaries may be identified a liquid/solid boundary (e.g., nozzle wall) or a liquid/air boundary (e.g., meniscus). Properties of the liquid inside the nozzle may also be specified, such as temperature, viscosity, and others. The design inputs may also include a threshold value of the liquid relaxation time, which may serve as a target for the design process.

At block 404, the liquid relaxation time, $T_{LR}$, of the meniscus is computed using the process described above in relation to FIGS. 2 and 3. For the first iteration of block 404, the liquid relaxation time is computed for the initial nozzle shape.

At block 406, the liquid relaxation time is compared to a threshold. If the liquid relaxation time is greater than the threshold, the process flow advances to block 408.

At block 408, the nozzle shape is modified. Various techniques may be used to determine the shape changes to be applied. For example, if the nozzle is symmetrical about a central axis, the nozzle shape may be adjusted by changing the radius of the nozzle at specified heights (values of Z). Various techniques may be used to ensure a suitable portion of the solution space (of possible nozzle shapes) is explored while staying within the specified external constraints. In some embodiments, the shape modifications may be predetermined according to a pre-programmed selection of nozzle geometries within the solution space. In some embodiments, the shape modifications may be determined, at least in part, based on changes in the liquid relaxation time between iterations. After the new nozzle shape is determined, the process flow returns to block 404 and the liquid relaxation time of the meniscus is computed using the new nozzle shape. Blocks 404, 406 and 408 may be repeated until the liquid relaxation time is below the specified threshold. Additionally, an upper limit may be placed on the number of iterations. If the limit is exceeded, the nozzle shape with the lowest liquid relaxation time may be outputted.

If, at block 406, the liquid relaxation time is below the specified threshold, the process flow advances to block 410, and the final nozzle shape is output. For example, the final nozzle shape may be stored to a non-transitory storage medium.

At block 412, a prototype nozzle is fabricated according to the final nozzle shape and tested to determine the actual liquid relaxation time for the physical nozzle. In some embodiments, fabricating the final nozzle shape may include printing the nozzle using a 3D printer such as the 3D printer 100 of FIG. 1. In such embodiments, the nozzle geometry may be converted to 3D printer instructions such as G-code. Testing the actual liquid relaxation time may include coupling the nozzle within a 3D printer and measuring the actual liquid relaxation time using, for example, high-speed photography.

At block 414, the measured liquid relaxation time is compared to a threshold. If the liquid relaxation time is greater than the threshold, the process flow advances to block 416. At block 416, the design input is modified and the process then returns to block 402 to generate a new nozzle shape for a new prototype. If the liquid relaxation time is less than the threshold, the process ends.

Various operations are described as multiple discrete operations, in turn, in a manner that is most helpful in understanding the present disclosure, however, the order of description may not be construed to imply that these operations are necessarily order dependent. In particular, the operations shown in FIG. 4 need not be performed in the order of presentation.

Figure 5:
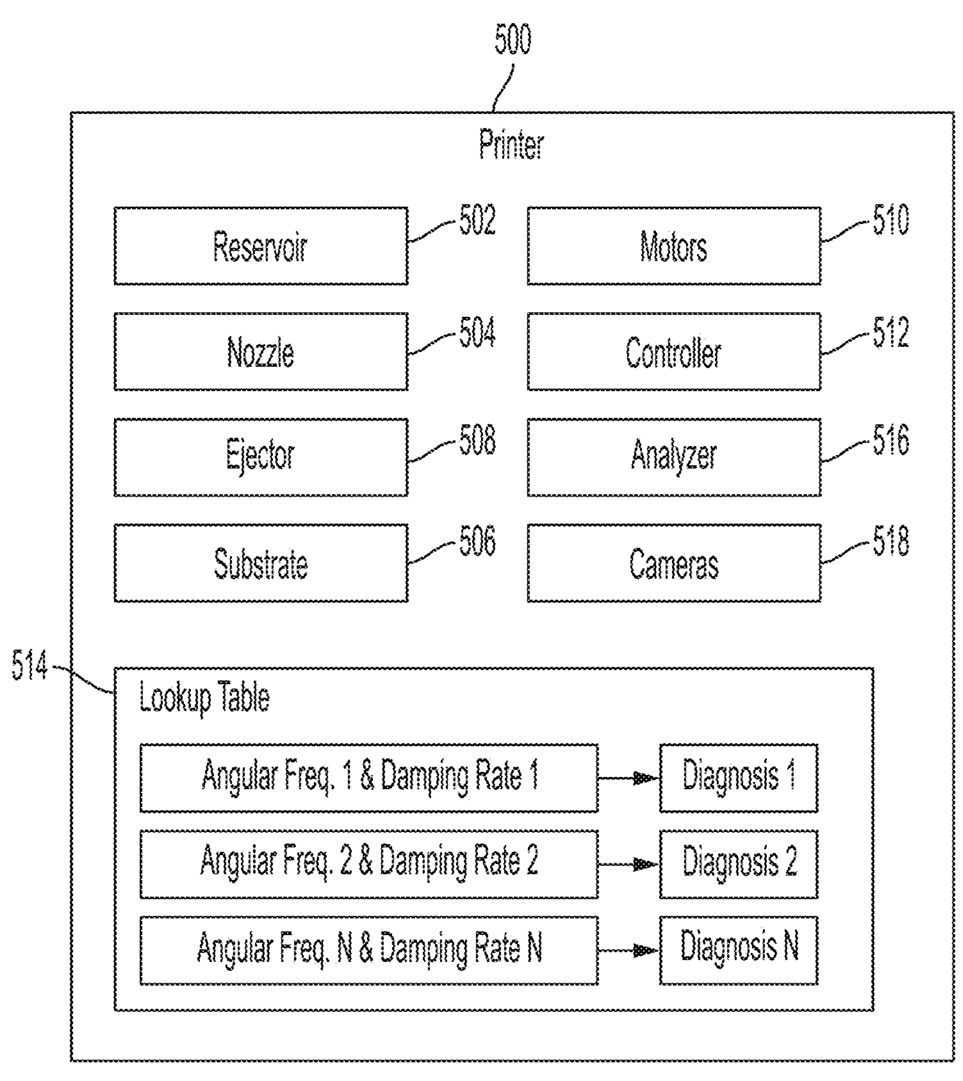
FIG. 5 is a block diagram of an example system for monitoring a printer's performance in accordance with certain aspects of the present disclosure.

FIG. 5 is a block diagram of an example system for monitoring a printer's performance in accordance with certain aspects of the present disclosure. The printer 500 may be any suitable type of 3D printer or 2D printer. For example, the printer 500 may be an inkjet printer, a liquid metal jetting printer (e.g., the 3D printer of FIG. 1B), binder jetting printer, a PolyJet printer, or a Multi Jet Fusion (MJF) printer, among others. The printer 500 includes a reservoir 502 for holding a liquid print material, which may be ink, a polymer, a binder, molten metal, and other suitable liquids. The reservoir 502 feeds the printing medium to the nozzle 504. Droplets of the printing medium are ejected through the nozzle 504 onto a substrate 506 in response to a stimulus from an ejector 508. The printer 500 may include more than one nozzle 504, reservoir 502, and ejector 508. The substrate 506 may be paper (in the case of 2D printing) or a build platform (in the case of 3D printing).

The printer 500 may also include one or more motors 510 for controlling various components of the printer 500. For example, motors 510 may be configured to move the nozzle 504, and/or the substrate 506 to properly position the ejected printing medium. The printer 500 may include a controller 512 for controlling components of the printer 500, such as positioning of the substrate 506 and/or nozzle 504, ejection of the printing medium, and others. The controller 512 may include any suitable combination of hardware and/or software, including microprocessors, application specific integrated circuits (ASICs), field programmable gate arrays (FPGAs), digital signal processors (DSPs), among others.

As described in herein, the shape of the nozzle 504 may configured to have improved ejection characteristics. In particular, the shape of the nozzle 504 may be designed in accordance with the techniques described herein so that the meniscus oscillations caused by the ejection of droplets of print medium have a high damping rate (i.e., low liquid relaxation time).

The printer 500 may also be configured to monitor the ejection characteristics to identify potential problems with the printing process. The monitoring process may be performed by an analyzer 516, which in some embodiments may be software or firmware running on the controller 512. The analyzer 516 monitors the printing process by processing images collected by one or more high-speed cameras 518 to generate one or more parameters describing the dynamics of the printing process. For example, the cameras 518 may generate images of the nozzle meniscus during the printing process. The images may be used to determine meniscus dynamics such as angular oscillation frequency and/or damping rate. The meniscus dynamics may be used as input to the lookup table 514, which relates the meniscus dynamics to a specific diagnosis for a given nozzle shape. The lookup table 514 may include any suitable number of entries. Each entry may be generated using the simulation techniques described in relation to FIGS. 2 and 3.

Figure 6:
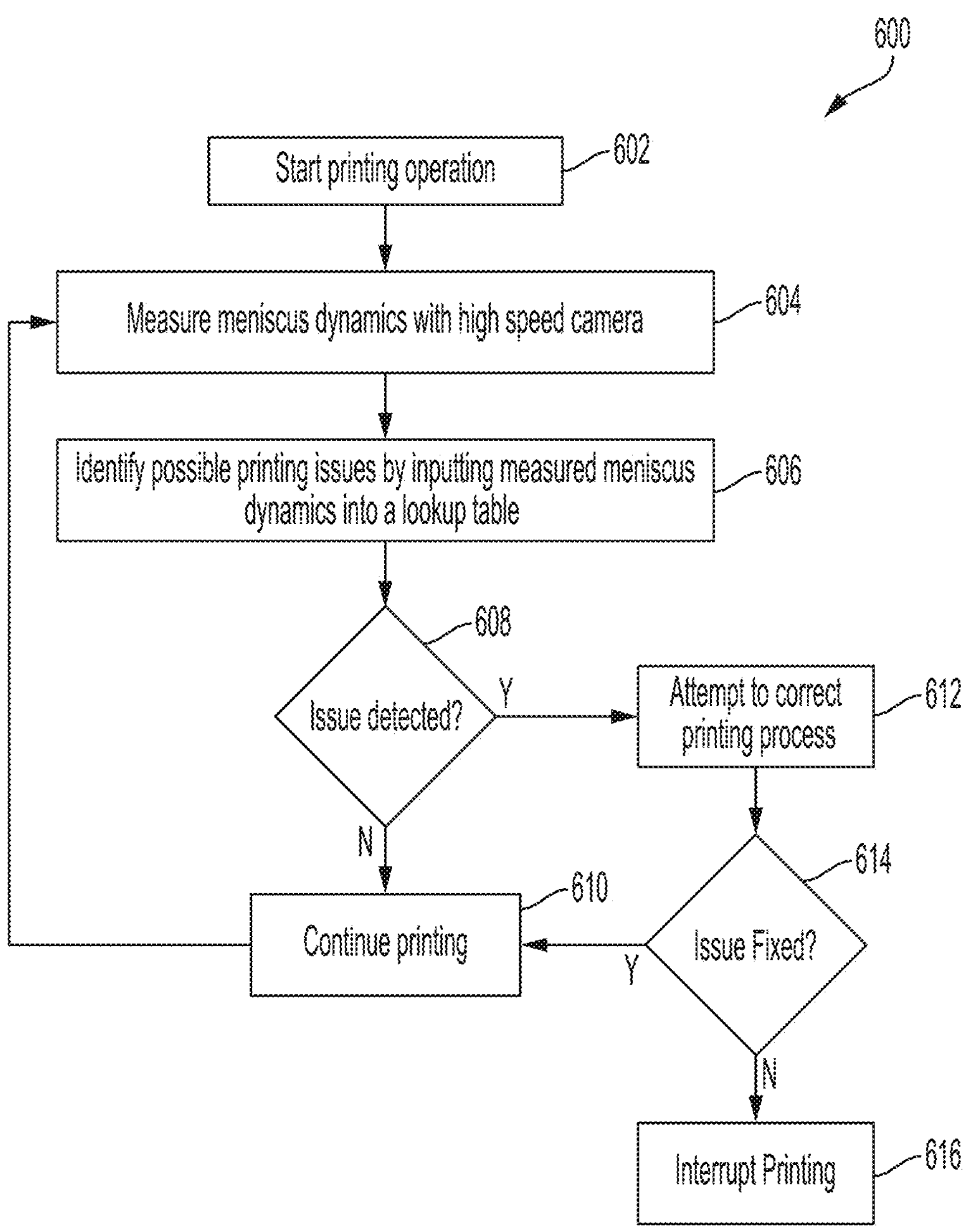
FIG. 6 is a process flow diagram of an example method of generating information to be used for monitoring a 3D printer in accordance with certain aspects of the present disclosure.

FIG. 6 is a process flow diagram of an example method of monitoring a 3D printer in accordance with certain aspects of the present disclosure. The method 600 may be performed by a printer such as the printer shown in FIG. 5 or the 3D printer shown in FIG. 1. The method 600 The method may begin at block 602.

At block 602, a printing operation is started. The printing operation may be any 2D or 3D printing process that uses a nozzle to eject liquid.

At block 604, the meniscus dynamics of the nozzle are measured. The measurements may be performed by one or more high-speed cameras. Images generated by the cameras can be analyzed to determine meniscus dynamics such as an angular oscillation frequency and/or damping rate of the meniscus.

At block 606, the possible printing issues are identified by inputting the measured meniscus dynamics into a lookup table. The result returned by the lookup table may indicate successful operation of the printer or a problem with the printer such as a clogged nozzle, for example. Successful operation of the printer may be indicated if the angular oscillation frequency and damping rate are close to their baseline values.

At block 608, a determination is made regarding whether a printing issue has been detected. If no issue is detected, the process flow may advance to block 610 and the printing process continues. Additionally, the process flow may also return to block 604 for a next iteration of the method. If an issue is detected, the process flow may advance to block 612, where the printer may attempt to correct the printing process. For example, if the nozzle is determined to be clogged, the printer may take corrective measures to try to clear the clog.

If at block 614 the issue is fixed, the process flow may continue to block 610 and printing continues. Otherwise, the process flow advances to block 616 and the printing process is interrupted.

Various operations are described as multiple discrete operations, in turn, in a manner that is most helpful in understanding the present disclosure, however, the order of description may not be construed to imply that these operations are necessarily order dependent. In particular, the operations shown in FIG. 6 need not be performed in the order of presentation.

Figure 7:
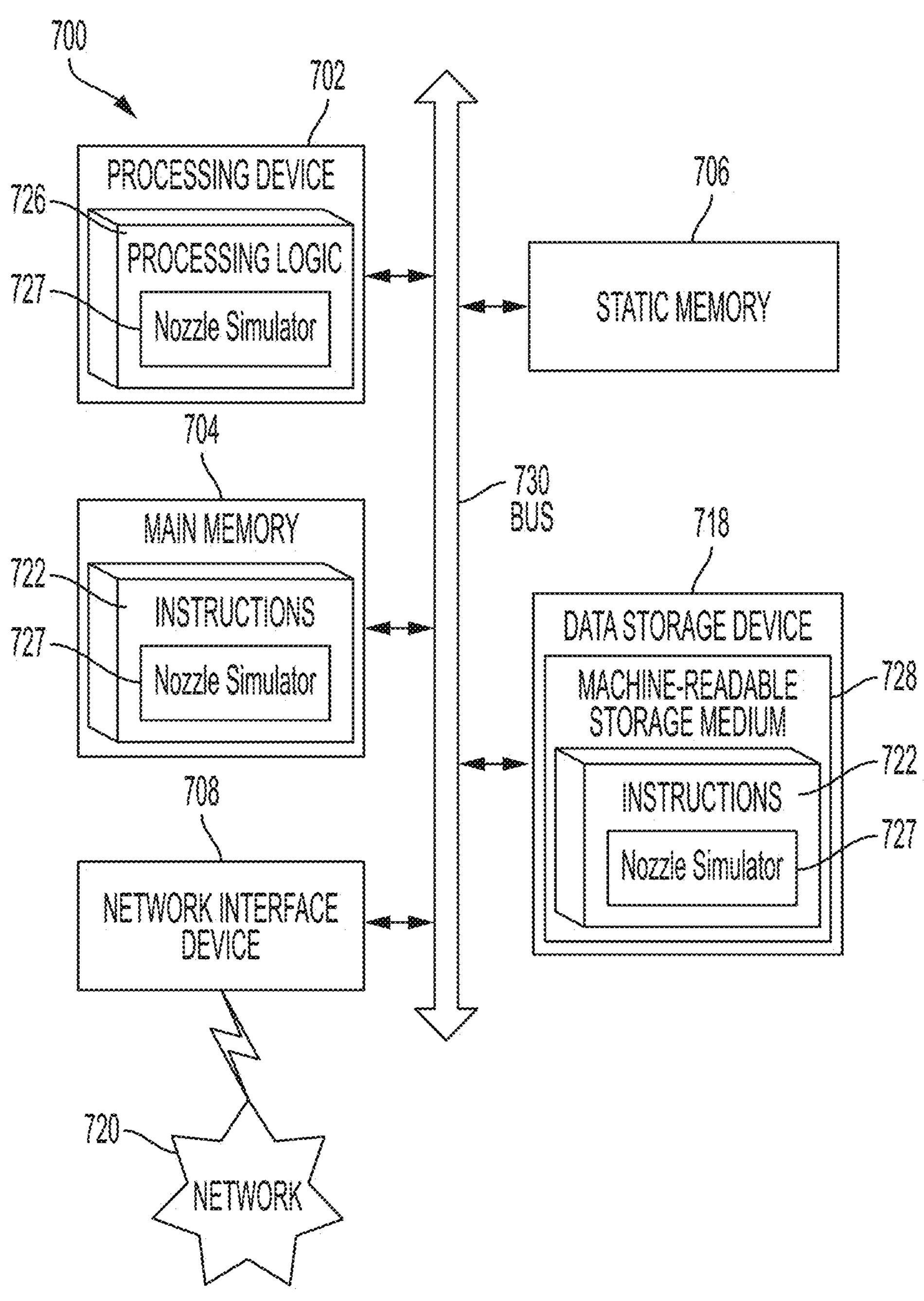
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the example form of a computer system 700 within which a set of instructions 722, for causing the machine to perform any one or more of the methodologies discussed herein, may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may execute processing logic 726 for performing the operations and steps discussed herein.

The data storage device 718 may include a machine-readable storage medium 728, on which is stored one or more set of instructions 722 (e.g., software). The instructions may include a nozzle simulator 727 embodying any one or more of the methodologies of functions described herein. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The non-transitory machine-readable storage medium 728 may also be used to store instructions to perform the methods and operations described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of determining the damping rate of unforced oscillations of a meniscus, comprising:

receiving input describing a shape of a container, physical parameters of a liquid inside the container, and an equilibrium shape of the meniscus;

generating a mesh conforming to the shape of the container, wherein the mesh comprises a plurality of nodes, each node representing a point inside the liquid;

generating a discrete version of a continuous eigenvalue problem based on the mesh;

computing nodal values for pressure, velocity components, and meniscus surface deformation corresponding to n least-damped late-time oscillation modes of the liquid and computing angular frequency and damping rate of the n least-damped late-time oscillation modes from the discrete version of the continuous eigenvalue problem;

identifying a mode of the n least-damped late-time oscillation modes that has a lowest damping rate;

computing a liquid relaxation time by inverting the damping rate of the identified mode, wherein the liquid relaxation time is an amount of time expected to pass before the liquid becomes quiescent; and outputting the liquid relaxation time.

2. The method of claim 1, comprising, in response to the liquid relaxation time being above a threshold value, modifying the shape of the container, and computing a new liquid relaxation time using the modified shape.

3. The method of claim 1, comprising, in response to the liquid relaxation time being below a threshold value, outputting a file that describes the shape of the container.

4. The method of claim 1, wherein the liquid is a molten metal.

5. The method of claim 1, wherein the container is a nozzle and the meniscus is a liquid-gas interface at an output of the nozzle.

6. The method of claim 5, wherein the unforced oscillations of the meniscus result from a simulated ejection of a liquid droplet from the outlet of the nozzle.

7. The method of claim 6, wherein the ejection of the liquid droplet is one step in a Drop-on-Demand (DoD) 3-dimensional printing process.

8. The method of claim 1, wherein the mesh is generated using a Finite Element Method (FEM) and triangular Taylor-Hood elements.

9. The method of claim 1, wherein computing the angular frequency and the damping rate of the n least-damped late-time oscillation modes from the discrete version of the continuous eigenvalue problem is performed using a Krylov-Schur projection-based algorithm.

10. The method of claim 1, wherein the container is a microfluidic device and the meniscus is a liquid-gas interface in a tube contained in the microfluidic device.

11. The method of claim 1, wherein the container is a nozzle of a drop-on-demand printer, and the meniscus is a liquid-gas interface of liquid print material in the nozzle.

12. The method of claim 11, wherein the drop-on-demand printer is a liquid metal jetting printer (LMJ), inkjet printer, binder jetting printer, PolyJet printer, or a Multi Jet Fusion (MJF) printer.

13. An apparatus for determining a damping rate of unforced oscillations of a meniscus, comprising:

a memory; and a processing device operatively coupled to the memory, wherein the processing device is to:

receive input describing a shape of a container, physical parameters of a liquid inside the container, and an equilibrium shape of the meniscus;

generate a mesh conforming to the shape of the container, wherein the mesh comprises a plurality of nodes, each node representing a point inside the liquid;

generate a discrete version of a continuous eigenvalue problem based on the mesh;

compute nodal values for pressure, velocity components, and meniscus surface deformation corresponding to n least-damped late-time oscillation modes of the liquid and computing angular frequency and damping rate of the n least-damped late-time oscillation modes from the discrete version of the continuous eigenvalue problem;

identify a mode of the n least-damped late-time oscillation modes that has a lowest damping rate;

compute a liquid relaxation time by inverting the damping rate of the identified mode, wherein the liquid relaxation time is an amount of time expected to pass before the liquid becomes quiescent; and output the liquid relaxation time.

14. The apparatus of claim 13, wherein the processing device is further to:

in response to the liquid relaxation time being above a threshold value, modify the shape of the container, and compute a new liquid relaxation time using the modified shape; and in response to the liquid relaxation time being below a threshold value, output a file that describes the shape of the container.

15. The apparatus of claim 13, wherein the container is a nozzle and the meniscus is a liquid-gas interface at an output of the nozzle.

16. The apparatus of claim 13, wherein the mesh is generated using a Finite Element Method (FEM) and triangular Taylor-Hood elements.

17. The apparatus of claim 13, wherein computing the angular frequency and the damping rate of the n least-damped late-time oscillation modes from the discrete version of the continuous eigenvalue problem is performed using a Krylov-Schur projection-based algorithm.

18. The apparatus of claim 13, wherein the container is a nozzle of a drop-on-demand printer, and the meniscus is a liquid-gas interface of liquid print material in the nozzle.

19. The apparatus of claim 18, wherein the drop-on-demand printer is a liquid metal jetting printer (LMJ), inkjet printer, binder jetting printer, PolyJet printer, or a Multi Jet Fusion (MJF) printer.

20. A non-transitory computer-readable storage medium having instructions stored thereon that, when executed by a processing device for determining a damping rate of unforced oscillations of a meniscus, cause the processing device to:

receive input describing a shape of a container, physical parameters of a liquid inside the container, and an equilibrium shape of the meniscus;

generate a mesh conforming to the shape of the container, wherein the mesh comprises a plurality of nodes, each node representing a point inside the liquid;

generate a discrete version of a continuous eigenvalue problem based on the mesh;

compute nodal values for pressure, velocity components, and meniscus surface deformation corresponding to n least-damped late-time oscillation modes of the liquid and computing angular frequency and damping rate of the n least-damped late-time oscillation modes from the discrete version of the continuous eigenvalue problem;

identify a mode of the n least-damped late-time oscillation modes that has a lowest damping rate;

compute a liquid relaxation time by inverting the damping rate of the identified mode, wherein the liquid relaxation time is an amount of time expected to pass before the liquid becomes quiescent; and output the liquid relaxation time.

21. The non-transitory computer-readable storage medium of claim 20, wherein the processing device is further to:

in response to the liquid relaxation time being above a threshold value, modify the shape of the container, and compute a new liquid relaxation time using the modified shape; and in response to the liquid relaxation time being below a threshold value, output a file that describes the shape of the container.

22. The non-transitory computer-readable storage medium of claim 20, wherein the container is a nozzle and the meniscus is a liquid-gas interface at an output of the nozzle.

23. The non-transitory computer-readable storage medium of claim 20, wherein the mesh is generated using a Finite Element Method (FEM) and triangular Taylor-Hood elements.

24. The non-transitory computer-readable storage medium of claim 20, wherein computing the angular frequency and the damping rate of the n least-damped late-time oscillation modes from the discrete version of the continuous eigenvalue problem is performed using a Krylov-Schur projection-based algorithm.

25. The non-transitory computer-readable storage medium of claim 20, wherein the container is a nozzle of a drop-on-demand printer, and the meniscus is a liquid-gas interface of liquid print material in the nozzle.

26. The non-transitory computer-readable storage medium of claim 25, wherein the drop-on-demand printer is a liquid metal jetting printer (LMJ), inkjet printer, binder jetting printer, PolyJet printer, or a Multi Jet Fusion (MJF) printer.

27. A method of determining the damping rate of unforced oscillations of a meniscus of liquid print material formed in a nozzle of a drop-on-demand printer, comprising:

receiving input describing a shape of the nozzle, physical parameters of the liquid print material inside the nozzle, and an equilibrium shape of the meniscus;

generating a mesh conforming to the shape of the nozzle, wherein the mesh comprises a plurality of nodes, each node representing a point inside the liquid print material;

generating a discrete version of a continuous eigenvalue problem based on the mesh;

computing nodal values for pressure, velocity components, and meniscus surface deformation corresponding to n least-damped late-time oscillation modes of the liquid print material and computing angular frequency and damping rate of the n least-damped late-time oscillation modes from the discrete version of the continuous eigenvalue problem;

identifying a mode of the n least-damped late-time oscillation modes that has a lowest damping rate;

computing a liquid relaxation time by inverting the damping rate of the identified mode, wherein the liquid relaxation time is an amount of time expected to pass before the liquid print material becomes quiescent; and outputting the liquid relaxation time.

28. The method of claim 27, comprising, in response to the liquid relaxation time being above a threshold value, modifying the shape of the nozzle, and computing a new liquid relaxation time using the modified shape.

29. The method of claim 27, comprising, in response to the liquid relaxation time being below a threshold value, outputting a file that describes the shape of the nozzle.

30. The method of claim 27, wherein the liquid print material is a molten metal.

31. The method of claim 27, wherein the unforced oscillations of the meniscus result from a simulated ejection of a droplet of the liquid print material from an outlet of the nozzle.

32. The method of claim 27, wherein the mesh is generated using a Finite Element Method (FEM) and triangular Taylor-Hood elements.

33. The method of claim 27, wherein computing the angular frequency and the damping rate of the n least-damped late-time oscillation modes from the discrete version of the continuous eigenvalue problem is performed using a Krylov-Schur projection-based algorithm.

34. The method of claim 27, wherein the drop-on-demand printer is a liquid metal jetting printer (LMJ), inkjet printer, binder jetting printer, PolyJet printer, or a Multi Jet Fusion (MJF) printer.

* * * * *